Nov. 21, 1939.  J. H. WILSON  2,180,449
ADJUSTING DEVICE FOR ENDLESS CHAINS
Filed June 21, 1938
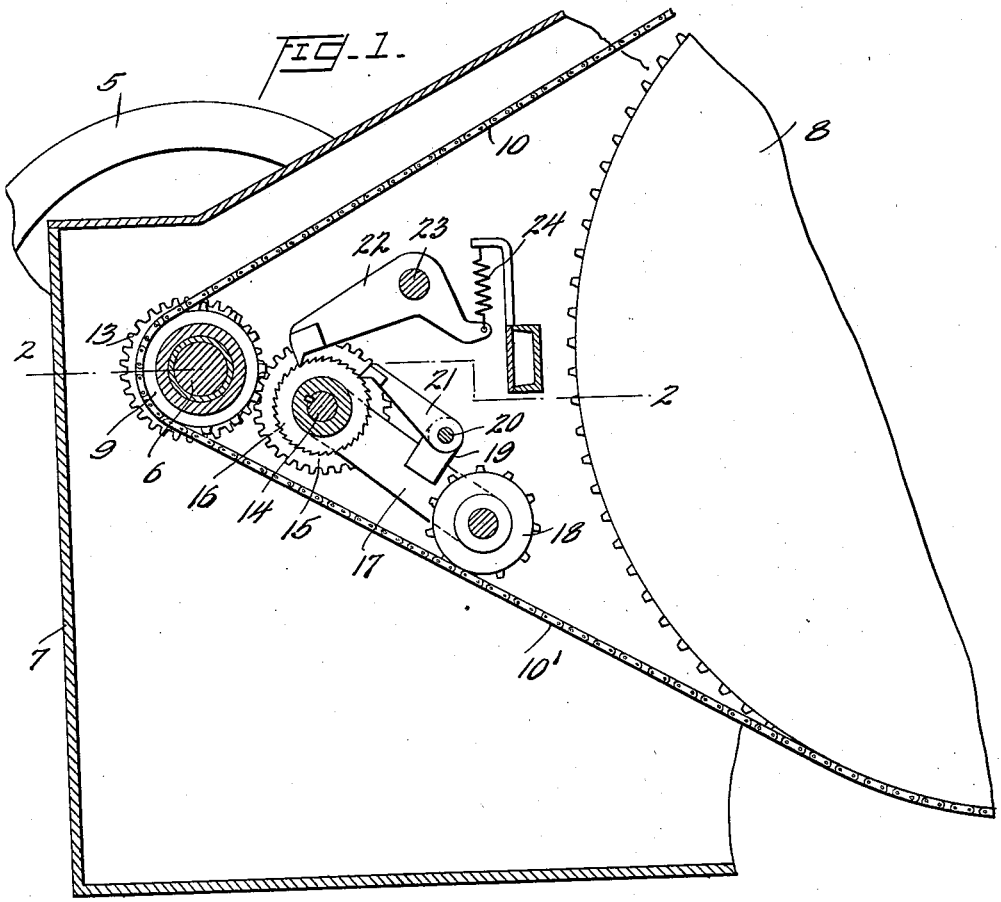
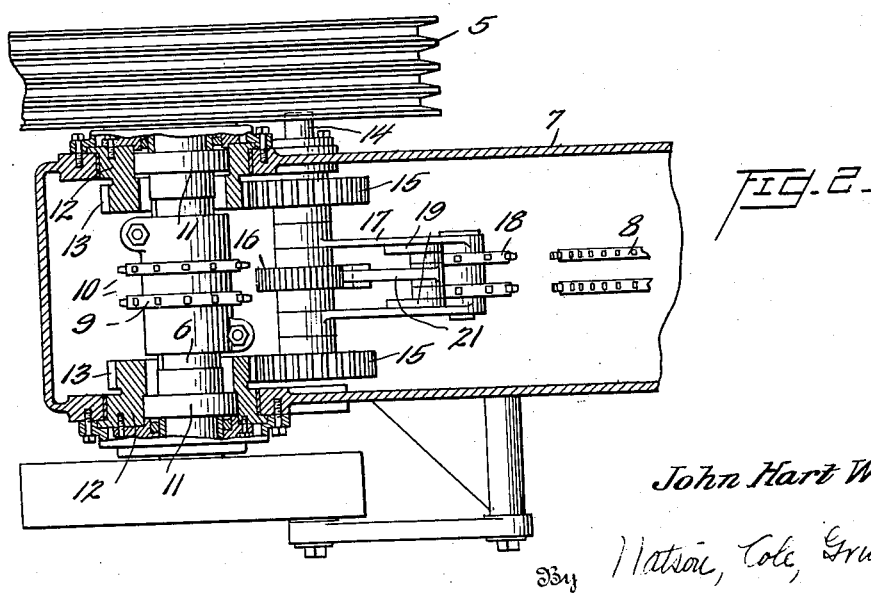
Inventor
John Hart Wilson,
By Watson, Cole, Grindle & Watson
Attorney Patented Nov. 21, 1939

2,180,449

UNITED STATES PATENT OFFICE 2,180,449

ADJUSTING DEVICE FOR ENDLESS CHAINS

John Hart Wilson, Wichita Falls, Tex.

Application June 21, 1938, Serial No. 215,016

6 Claims. (Cl. 74—242.16)

This invention relates to adjusting devices for endless chains, and is particularly adapted for adjusting endless chains used for driving certain types of mechanism, such as deep well pumps and the like, in which the driving mechanism is called upon to exert first a driving force and then a resisting force, so that one or both reaches of the chain become alternately slack and taut. However, the device of the present invention is not restricted to use with such mechanisms, but may be advantageously used in connection with most chain drives, whether the power transmitted is constant or variable.

Chain adjusting devices employing movable bearings, and means actuated in accordance with the slackness of a reach of a chain for adjusting said bearings, are known, such devices usually comprising a member arranged adjacent the path of the chain and adapted to be struck or actuated when the chain exceeds a predetermined degree of slackness due to wear or other causes. In such devices the operating force may consist merely of the weight of the chain as it rests upon the actuating member, which may be insufficient to effect the necessary adjustment of the chain. In other cases the actuating force may be exerted by means of a projection on the chain adapted to strike against the actuating member of the adjusting mechanism. In such cases a greater actuating force is available, but only instantaneously. In either case there are obvious disadvantages, one of which is that, for a considerable period prior to the effective actuation of the adjusting mechanism, the chain or a projecting part thereof must run against or intermittently strike against the actuating member, causing considerable wear, and possible breakage. Another disadvantage of such devices lies in the fact that the actuating force available has no particular relation to the force necessary to effect the chain tightening operation, and may be insufficient for the purpose.

It is an object of the present invention to provide chain adjusting mechanism which is positive in operation, and which employs an operating force considerably greater than that which is utilized by the prior art devices mentioned above.

A further object of the present invention is the provision of a chain adjusting device which is actuated whenever the chain exceeds a predetermined degree of slackness, the actuating member of which comprises a rotary member adapted to ride on the chain, in all conditions of the latter, thus obviating the wear which is necessarily attendant upon the use of prior art adjusting devices of the kind described above.

A further object of the present invention is the provision of chain adjusting mechanism for use in connection with chains having a reach which becomes alternately slack and taut, in which the force actuating the adjusting mechanism is that which causes the chain to become taut after a slack period, such force being of course proportional to that exerted by the chain driven mechanism and therefore proportional to the force necessary for effecting a suitable adjustment of the chain.

Other and further objects, features and advantages of the present invention will be more apparent to those skilled in the art upon a consideration of the following specification and accompanying drawing in which:

Figure 1 is a side elevation, partly in section, of a device constructed in accordance with the present invention; and Figure 2 is a horizontal section on line 2—2 of Figure 1.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

For purposes of illustration, the mechanism of the present invention has been shown as applied to a type of mechanism commonly employed for operating deep well pumps. In such cases the pump driving mechanism commonly derives its power from a stationary engine, not shown, the power being received at the pump driving mechanism by a belt driven pulley 5. The latter is secured on a shaft 6, journalled in a suitable frame 7. The pumping mechanism, represented in Figure 1 by a large sprocket wheel 8, is driven from the shaft 6 by means of a sprocket 9 secured thereon, and a sprocket chain 10. The remainder of the pumping mechanism forms no part of the present invention and will not be illustrated or described. However, it is to be noted that, due to the nature of the work done by the driving mechanism, the chain 10 alternately exerts a driving force and a resisting force on the sprocket wheel 8, so that the lower reach 10' of the chain 10 (as well as the upper reach of the chain) become alternately taut and slack.

In accordance with the present invention, the shaft 6 is journalled in anti-friction bearings 11 supported within eccentric cages 12, the latter being suitably journalled in the frame 7. Each of the eccentric cages 12 is provided with a toothed peripheral portion 13. A ratchet shaft 14 is journalled in the frame 7 adjacent the shaft 6 and has secured thereon a pair of spur gears 15 meshing with the toothed portions 13 of the eccentric cages 12. Likewise secured upon the shaft 14 is a ratchet 16. A bifurcated arm 17 is pivoted on the shaft 14 and carries at its outer end an idler sprocket 18 which is adapted to rest upon and mesh with the lower reach 10' of the chain 10. Intermediate the ends of the arm 17 there is provided a pair of upstanding ears 19 carrying a pin 20 on which is pivoted a pawl 21, the latter being adapted for engagement with the teeth of the ratchet 16. A detent 22, pivoted on a pin 23 suitably supported in the frame 7, is normally held in engagement with the teeth of the ratchet 16 by a spring 24 and serves to restrain the ratchet 16 and its shaft 14 against clockwise movements.

As hereinbefore mentioned, the lower reach 10' of the chain 10 becomes alternately slack and taut, and the arm 17 and idler sprocket 18 are thereby caused to oscillate through a small arc about the shaft 14. This normal oscillation of the arm 17 is not sufficient to cause the pawl 21 to fall over the edge of the tooth with which it is currently engaged, and the shaft 14 is therefore not rotated. As wear occurs in the chain 10, or the latter becomes longer for any reason, the intermittent slackness of the lower reach 10' increases in extent. As soon as the slackness of the reach 10' increases to such an extent that the pawl 21, during the slack period, is permitted to fall over the edge of the tooth with which it has been engaged, and thus to engage a new tooth, it is apparent that during the next taut period of the reach 10', the ratchet 16 and shaft 14 are rotated to the extent of one tooth. By this action, the detent 22 is raised and lowered into engagement with a new tooth, thus serving to retain the ratchet 16 and shaft 14 in the new position. As the shaft 14 rotates the spur gears 15, secured thereon, cause a corresponding rotation of the eccentric cages 12, thus moving the bearings 11 and shaft 6 a slight distance to the left and tightening the chain 10. This operation will be repeated whenever the slackness of the lower reach 10' of the chain 10 exceeds a predetermined extent depending upon the size of the teeth of the ratchet 16.

It is apparent that the force which actuates the chain tightening mechanism is that which causes the reach 10' to become taut, and is proportional to the working force exerted by the pumping mechanism. Accordingly, the force actuating the chain tightening mechanism corresponds to that necessary to effect the chain tightening operation. The above described device is therefore positive in operation and will serve to maintain the chain 10 at the proper degree of tightness at all times.

Since the member which rides on the chain 10 is an idler sprocket and rotates freely in mesh with the chain 10, it does not add substantially to the amount of wear to which the chain is subjected. Because both ends of the sprocket shaft are shifted simultaneously and to the same extent, there is no possibility of stressing the two sides of the chain unequally, with attendant disadvantages.

While the device of the present invention is particularly suited for chain drives having a variable load, as described, it may also be advantageously used with drives having a constant load, since nearly every such mechanism is stopped from time to time, for one reason or another. When stopped, the chain of course becomes slack, and if it is sufficiently slack so that tightening is necessary, the pawl will engage a new tooth, and the tightening operation will take place when the drive is started up again. This mode of operation will be satisfactory since, in normal use, such drive chains require tightening only at infrequent intervals.

It will of course be obvious that in applying the present invention to a driving mechanism in which the sprocket shaft is disposed vertically and the chain moves in a horizontal plane, the idler sprocket 18 may be maintained in constant contact with the chain by means other than gravity.

Having thus described the invention, what is claimed as new and desired to be secured by Letters Patent is:

1. In combination with chain-driven mechanism including a chain, a frame, a sprocket shaft, means adjustably supporting said sprocket shaft in said frame, a sprocket on said shaft in driving engagement with said chain, means for actuating said supporting means to effect adjustment of said sprocket shaft relative to said frame, said actuating means comprising a member adapted to ride on a reach of said chain, and means connecting said member and said supporting means and adapted to actuate the latter whenever the slackness of said reach exceeds a predetermined extent.

2. In combination with chain-driven mechanism including a chain, a frame, a sprocket shaft, means adjustably supporting said sprocket shaft in said frame, a sprocket on said shaft in driving engagement with said chain, means for actuating said supporting means to effect adjustment of said sprocket shaft relative to said frame, said actuating means comprising a rotatable ratchet, means operatively connecting said ratchet and said supporting means, a pivoted arm, a pawl carried by said arm and having an operative engagement with said ratchet, and a member carried on the free end of said arm and adapted to ride on a reach of said chain, whereby said arm and pawl are caused to fall as said reach becomes slack and to be lifted by said reach as the latter becomes taut, said pawl being adapted to remain in engagement with the same tooth of said ratchet so long as the slackness of said reach remains within a predetermined limit.

3. In combination with the mechanism defined in claim 2, means for preventing rotation of said ratchet in a direction to increase the slackness of said chain.

4. The combination defined in claim 2, said member comprising an idler sprocket journalled on said free end of said arm.

5. In combination with chain-driven mechanism including a chain, a frame, eccentric members journalled in said frame, said eccentric members having toothed portions, a sprocket shaft journalled in said eccentric members, a sprocket on said shaft in driving engagement with said chain, a ratchet shaft journalled in said frame, toothed members on said ratchet shaft meshing with said toothed portions of said eccentric members, a ratchet on said ratchet shaft, a pivoted arm, a pawl carried by said arm and having an operative engagement with said ratchet, and a member carried on the free end of said arm and adapted to ride on a reach of said chain, whereby said arm and pawl are caused to fall as said reach becomes slack and to be lifted by said reach as the latter becomes taut, said pawl being adapted to remain in engagement with the same tooth of said ratchet so long as the slackness of said reach remains within a predetermined limit.

6. In combination with chain-driven mechanism including a chain, a frame, a sprocket shaft, means adjustably supporting said sprocket shaft in said frame, a sprocket on said shaft in driving engagement with said chain, means for actuating said supporting means to effect adjustment of said sprocket shaft relative to said frame, said actuating means comprising a member in constant contact with a reach of said chain, and means connecting said member and said supporting means and adapted to actuate the latter whenever the slackness of said reach exceeds a predetermined extent.

JOHN HART WILSON.